United States Patent
Chen et al.

(10) Patent No.: US 7,148,621 B2
(45) Date of Patent: Dec. 12, 2006

(54) INTEGRATED FOCUSING EMITTER

(75) Inventors: Zhizhang Chen, Corvallis, OR (US); Ronald L. Enck, Corvallis, OR (US); Sriram Ramamoorthi, Corvallis, OR (US); Qin Liu, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 476 days.

(21) Appl. No.: 10/825,754

(22) Filed: Apr. 16, 2004

(65) Prior Publication Data
US 2004/0251805 A1 Dec. 16, 2004

Related U.S. Application Data

(62) Division of application No. 09/881,981, filed on Jun. 14, 2001, now Pat. No. 6,758,711.

(51) Int. Cl.
H01J 1/62 (2006.01)
H01J 63/04 (2006.01)

(52) U.S. Cl. .................. 313/497; 313/495; 313/496
(58) Field of Classification Search ........... 313/495, 313/496, 497, 309
See application file for complete search history.

(56) References Cited

U.S. PATENT DOCUMENTS

| | | | |
|---|---|---|---|
| 4,923,421 A | 5/1990 | Brodie et al. | |
| 5,090,932 A | 2/1992 | Dieumegard et al. | |
| 5,232,549 A | 8/1993 | Cathey | |
| 5,413,513 A | 5/1995 | Horne et al. | |
| 5,528,103 A | 6/1996 | Spindt et al. | |
| 5,541,473 A | 7/1996 | Duboc, Jr. et al. | |
| 5,557,596 A | 9/1996 | Gibson et al. | |
| 5,658,832 A | 8/1997 | Bernhardt et al. | |
| 5,877,594 A | 3/1999 | Miyano et al. | |
| 6,008,576 A | 12/1999 | Nakatani et al. | |
| 6,096,570 A | 8/2000 | Hattori | |
| 6,137,212 A | 10/2000 | Liu et al. | |
| 6,137,213 A | 10/2000 | Moyer et al. | |
| 6,153,978 A | 11/2000 | Okamoto | |
| 7,044,823 B1* | 5/2006 | Chen et al. | 445/50 |

FOREIGN PATENT DOCUMENTS

EP 0289278 11/1988
EP 0559156 9/1993

OTHER PUBLICATIONS

Lee, Jin Ho et al "Fabrication and characterization of silicon field emitter arrays with focusing electrode by the chemical mechanical polishing process." J. Vac. Sci. Technol B 16(2), Mar./Apr. 1998, 811-814.
Endo, Yasuhiro et al "Microelectron gun with silicon field emitter", J. Vac. Sci Technol. B 16(6), Nov./Dec. 1998, 3082-3085.
Itoh, Junji et al, "Fabrication of double-gated Si field emitter arrays for focused electron beam generation" J. Vac Sci. Technol. B 13(5), Sep./Oct. 1995, 1968-1972.

* cited by examiner

Primary Examiner—Nimeshkumar D. Patel
Assistant Examiner—Anthony Perry
(74) Attorney, Agent, or Firm—Timothy F. Myers

(57) ABSTRACT

A method for creating an electron lens includes the steps of applying a polymer layer on an emitter surface of an electron emitter and then curing the polymer layer to reduce volatile content.

14 Claims, 17 Drawing Sheets

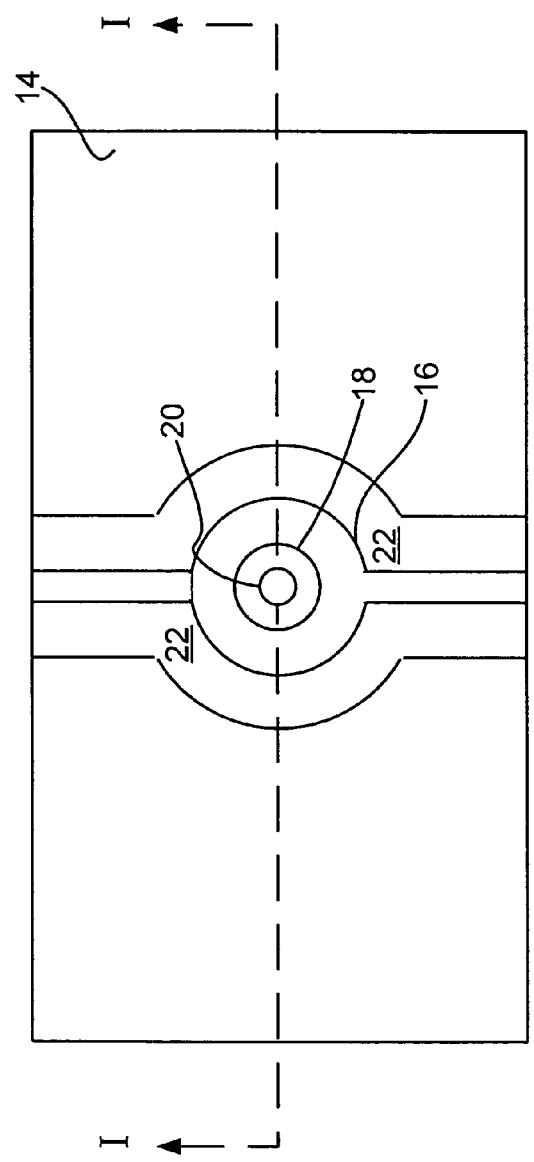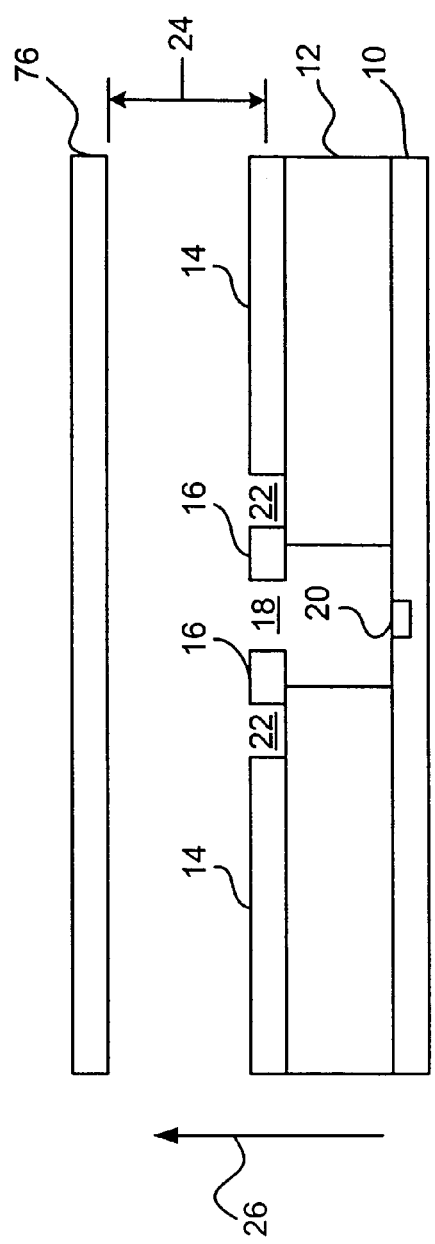
Fig. 1A
Fig. 1B

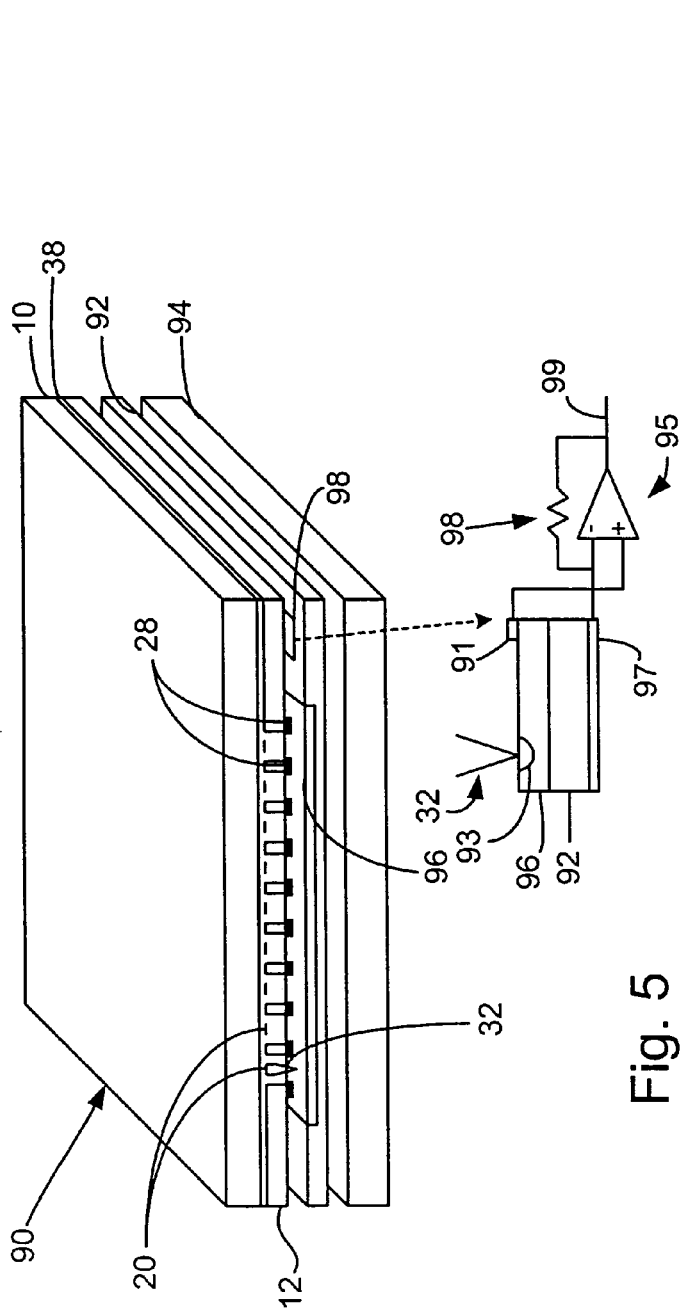
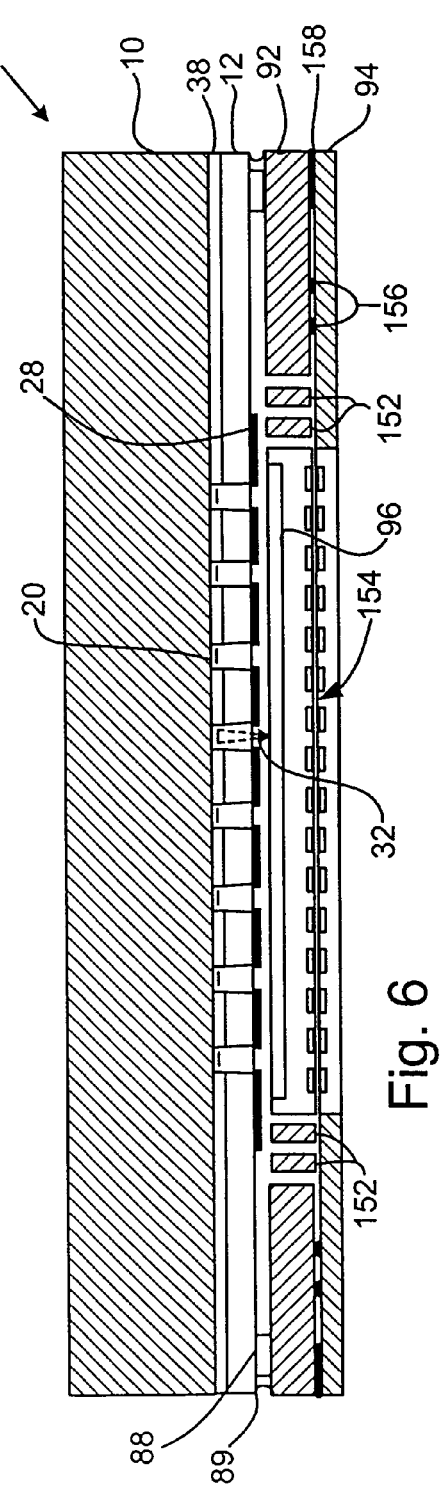
Fig. 5
Fig. 6

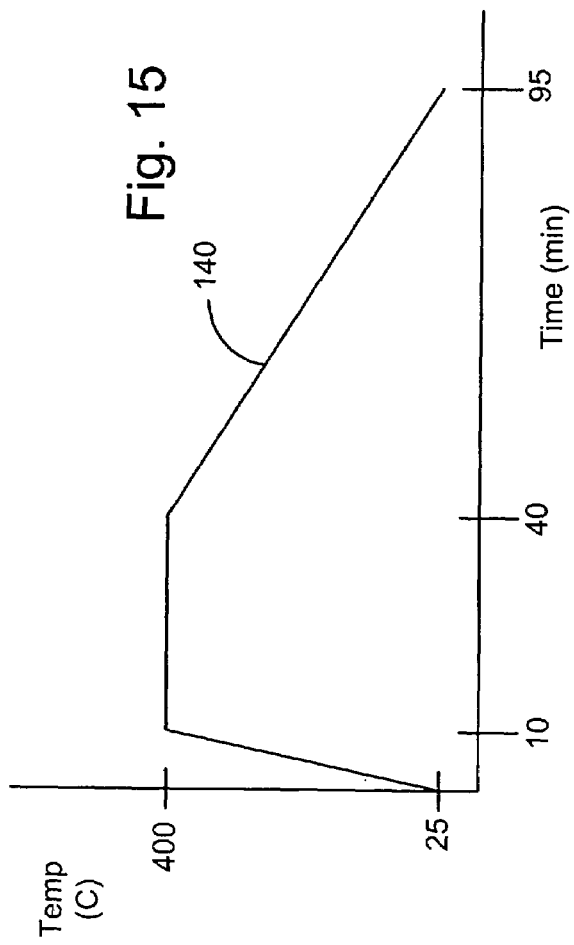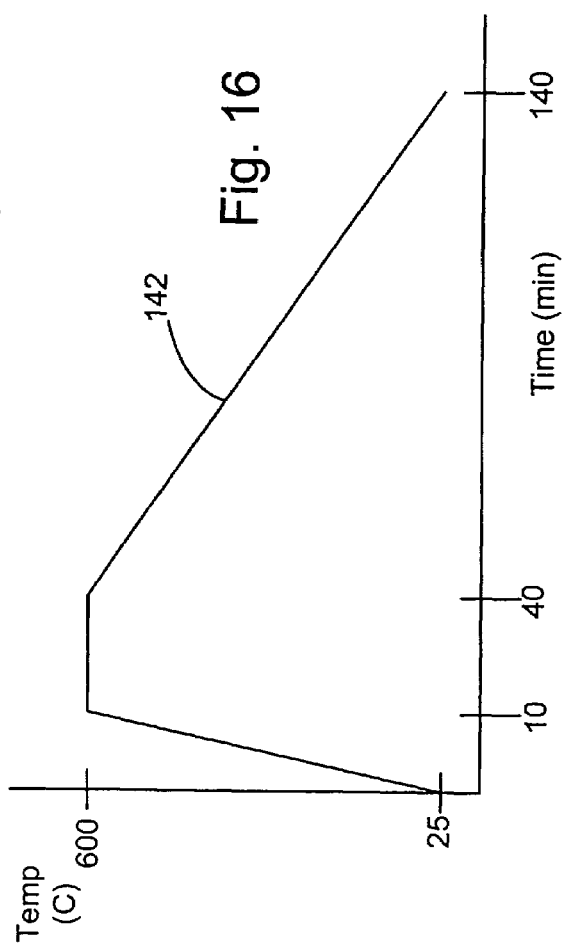

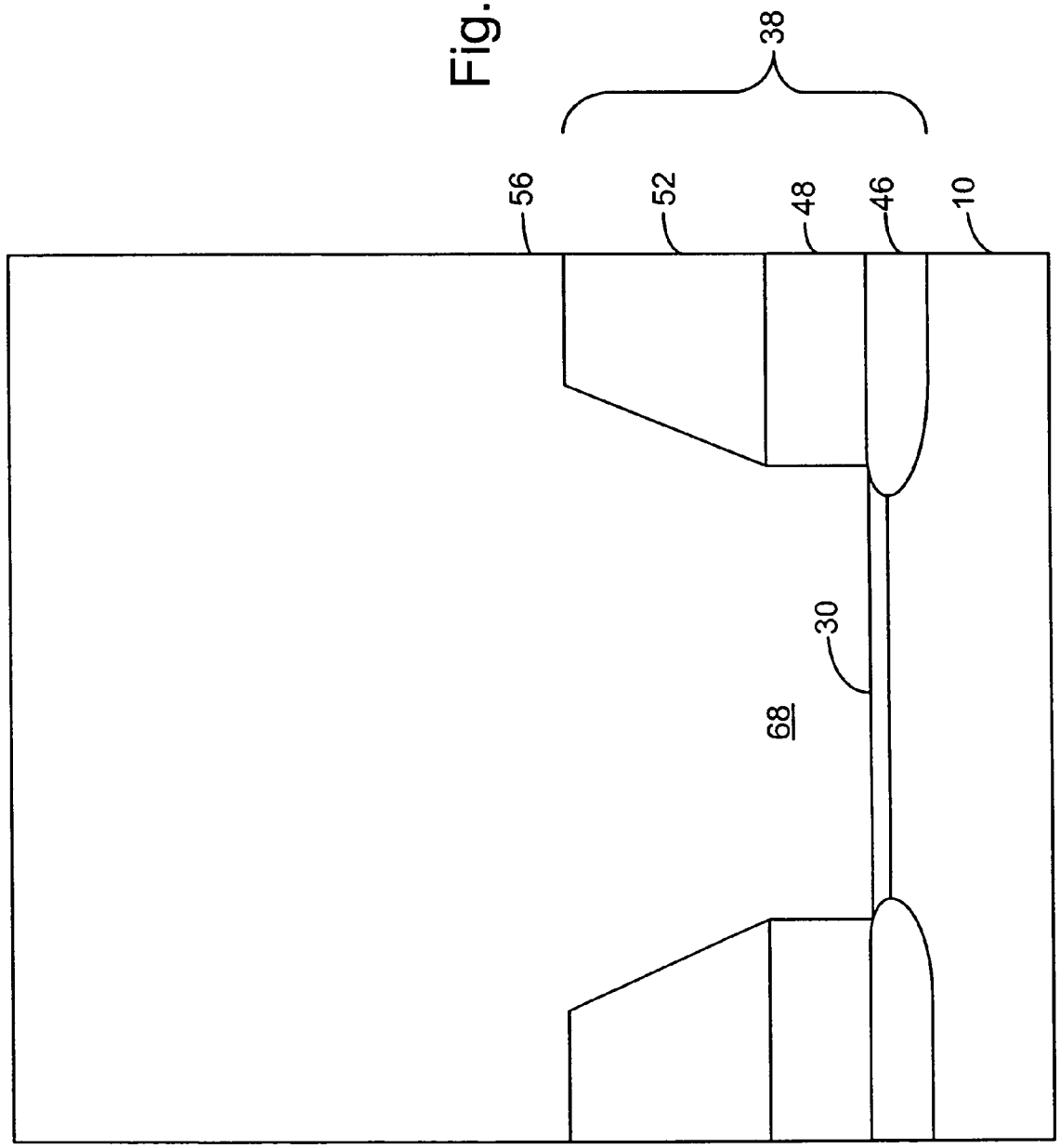

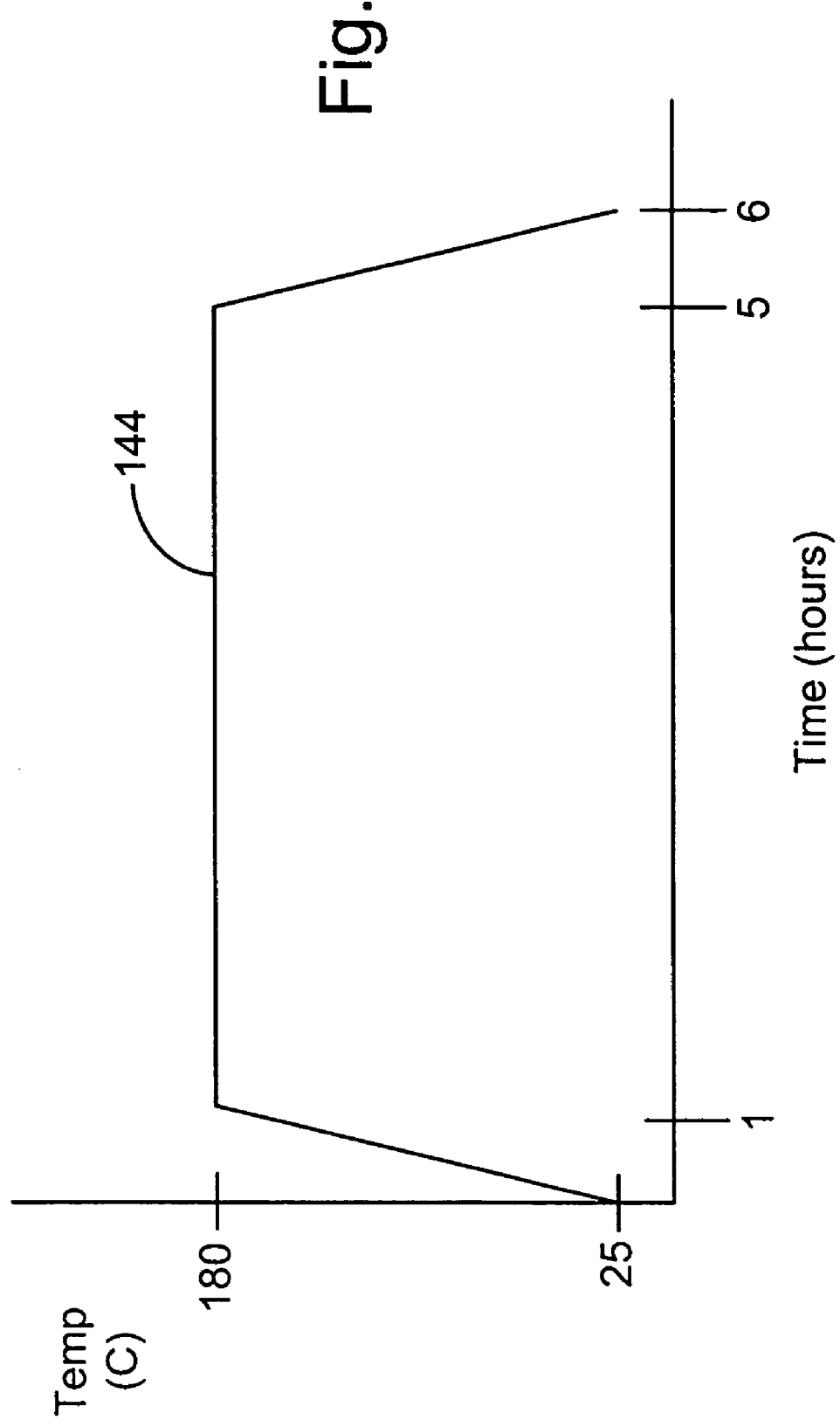

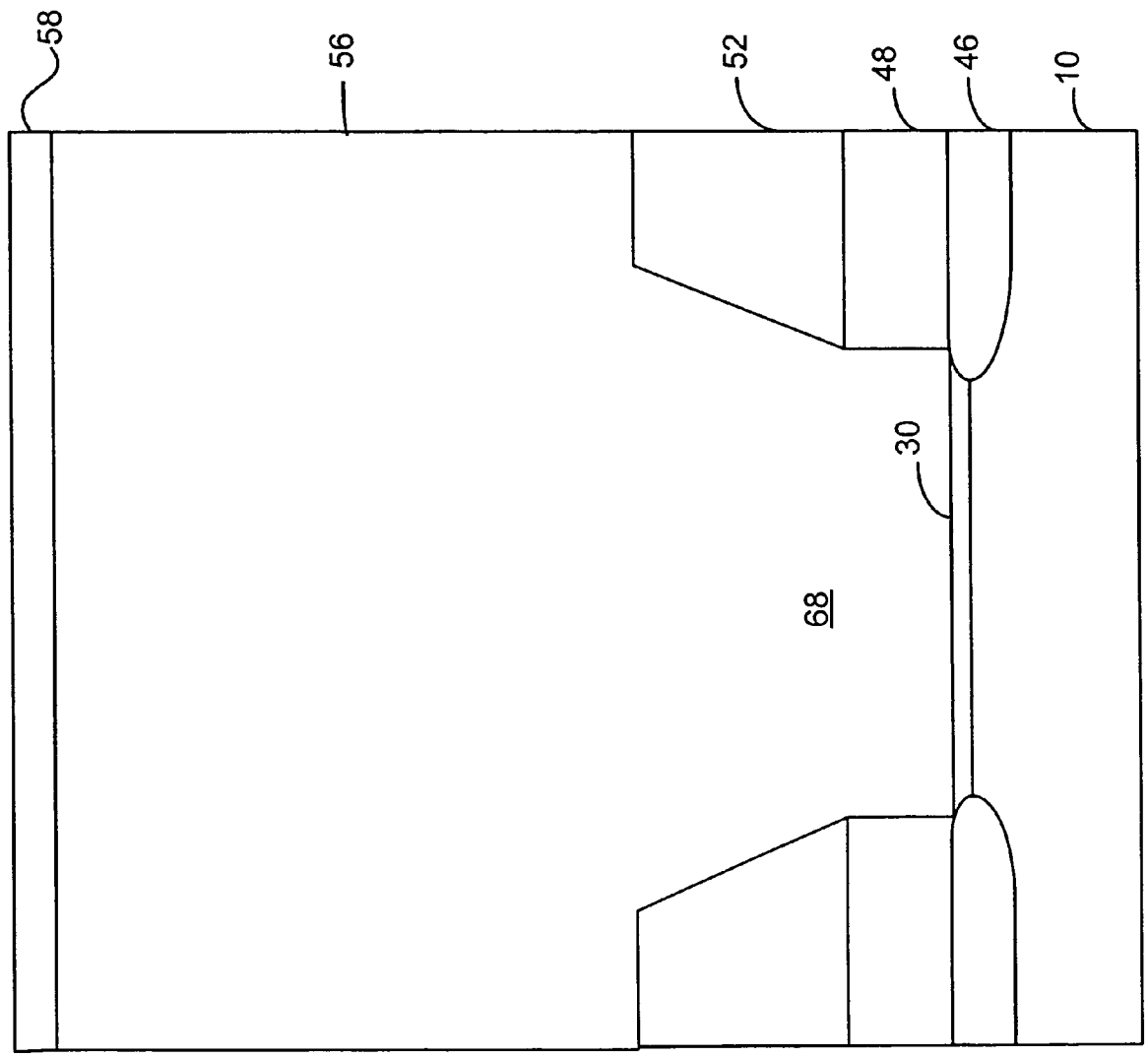

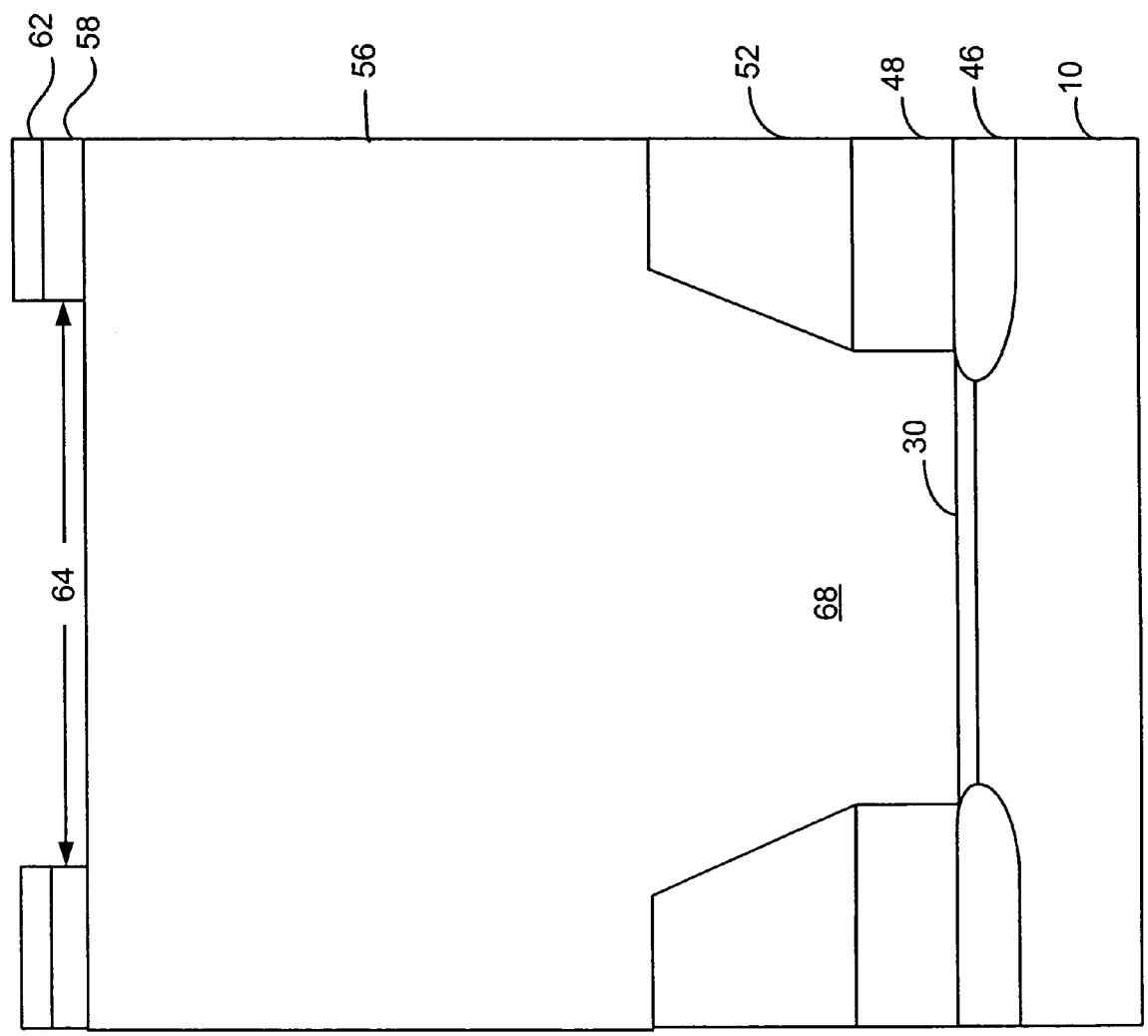

INTEGRATED FOCUSING EMITTER

This application is a divisional of application Ser. No. 09/881,981, filed Jun. 14, 2001, herein incorporated by reference.

BACKGROUND OF THE INVENTION

The present invention relates to the fabrication of lens design for electron emitters, particularly those electron emitters used in mass storage and display devices often incorporated in many electronic devices.

Computing technology continues to become less expensive while providing more capability. To allow computing technology to continue these positive trends, peripheral devices such as mass storage devices and display devices must continue to advance. Much criticism has been voiced in the trade press about the lack of mass storage devices such as disk drives, CD-ROMs, and DVD drives, to name a few, to increase their data rates up with the advancing speed of the microprocessors found in contemporary personal computers. However, hard disk drives, for example have been able to increase their storage density tremendously over the last decade but are now encountering physical limitations that prevents further progress in this area. Display devices, such as LCD monitors have had difficulty in fulfilling demand due to the complexity of manufacturing them with near-zero defects. Further, the use of passive LCD technology has required the addition of backlights to allow for viewing in different ambient light conditions thereby adding cost and increasing power requirements.

Electron beam technology has been present for many years in consumer products such as television (TV) tubes and computer monitors. These devices use what is known as "hot cathode" electrodes to create a source of electrons that are directed to and focused on the viewing screen. While research has taken place in a number of new technological fields with emission devices, the field of "cold cathode" electron emitters such as Spindt-tips and flat emitters has attracted the attention of many manufacturers.

Several problems exist in converting this cold cathode technology to products. One such problem is the creation of an electron focusing structure that can be used in multiple applications that require a high density of cold cathode emitting devices such as with mass storage and display devices. Conventionally, dielectric materials are used as spacer material between the electron focusing structure and the electron emitter. However, the cost and complexity of building the electron focusing structure with dielectric material hinders the rapid development of new products using cold cathode technology. In order to further the introduction of new products using cold cathode technology, more cost effective and simpler processes for building electron focusing structures and ultimately the mass storage and display devices are needed.

SUMMARY OF THE INVENTION

A method for creating an electron lens includes the steps of applying a polymer layer on an emitter surface of an electron emitter and then curing the polymer layer to reduce volatile content.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts, though not necessarily identical, through the several views.

FIG. 1A is a top view of an exemplary embodiment of an integrated focusing emitter.

FIG. 1B is a cross-sectional view of the exemplary embodiment illustrated in FIG. 1A.

FIG. 5 is a perspective view of an exemplary embodiment of a mass storage device that incorporates the invention.

FIG. 6 is a cross-sectional view of an alternative exemplary embodiment of a mass storage device that incorporates the invention.

FIGS. 15–16 are charts that illustrate exemplary temperature profiles for alternative annealing processes used to create an electron emitter.

FIG. 17 is an illustration of the application of a polymer layer to the electron emitter base.

FIG. 18 is a chart of an exemplary curing process used to extract volatile content from the polymer layer shown in FIG. 17.

FIG. 19 is an illustration of the deposition of a conductive layer on the polymer layer.

FIG. 20 is an illustration of the masking and etching of the conductive layer of FIG. 19 to create an electron lens opening.

DETAILED DESCRIPTION OF PREFERRED AND ALTERNATIVE EMBODIMENTS

Figure 2:
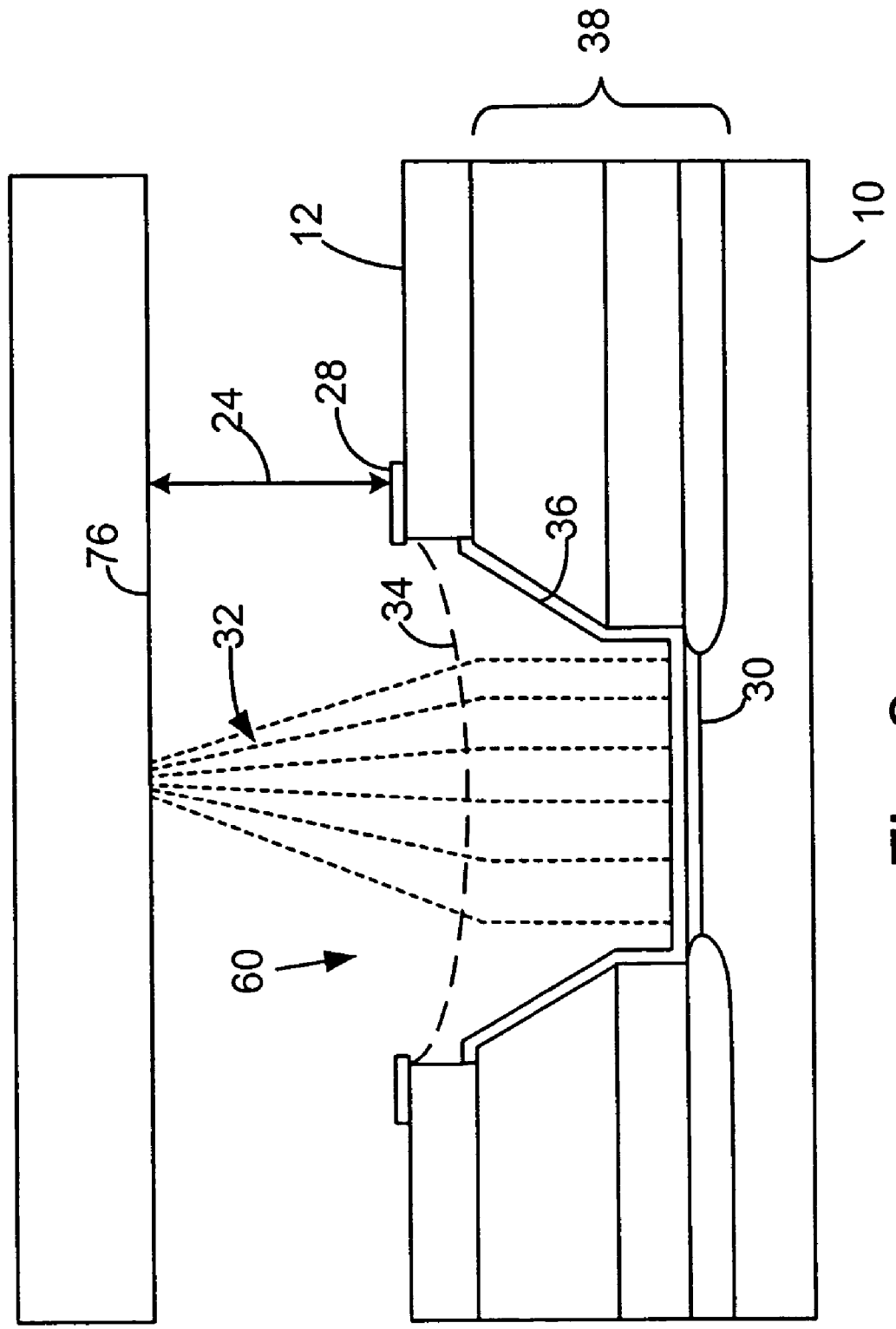
FIG. 2 is an exemplary cross-sectional view of an alternative embodiment of an integrated focusing emitter with a direct tunneling emitter.

To reduce costs and allow for reduced processing steps, the invention incorporates using a polymer layer as spacer material between the electron emitter and the focusing lens thereby creating an integrated focusing lens. To allow for incorporation of a polymer spacer layer several problems must be overcome.

First, polymer material generally has volatile components that can outgas over time. This outgassing can be a concern when the electron emitter is operating in a vacuum, typically less than $10^{-5}$ Torr of air pressure. The outgassing of polymer material can affect the air pressure level, thus requiring an active vacuum pump or getter material to remove the release volatile contents. Further, if the volatile contents of the polymer are released into the vacuum during operation, an emitted electron can strike a portion of the volatile content and ionize it. If there is a large voltage potential between components in the devices incorporating the electron emitter, the ionized volatile component accelerates toward the cathode of the emitter and collides with it, thereby causing damage. Thus, it is customary to use spacer material that does not outgas. The invention includes a curing process for the polymer material that reduces significantly the volatile contents of the polymer material such that a vacuum of less than $10^{-5}$ Torr can be maintained without active vacuum pumping.

Second, because of the material interface characteristics, high stress interfaces can exist between a polymer spacer material and the conductive material used to create the electron lens. A high stress interface can result in rough surfaces and cracks in the conductive material that might affect the performance of the electron lens. The invention includes using preferably a substantially gold material for the conductive layer used for the electron lens.

Third, because the polymer material is etched by using the opening in the conductive layer for the electron lens as a mask for etching polymer material, the etching process preferably accounts for an etch profile with minimal undercutting under the conductive layer that is used for the electron lens. Too much undercutting causes the conductive layer to not have adequate support and might cause the electron lens to become deformed and not operate properly.

Fourth, the etching process for the polymer material must not significantly etch the conductive layer used for the electron lens or leave residue from the etching process on the emitter surface. Any material on the emitter surface, such as traces of the conductive lens layer or polymer material can affect the performance of the electron emitter by changing its emission characteristics.

Fifth and most important, the etch selectivity of the polymer etch process is important so as to not significantly etch the emitter surface which can damage the electron emitter. Thus, the etch process of the invention balances the etch conditions to trade off etch rate, etch residue, etch selectivity of the conductive lens layer, etch selectivity of the emitter surface, and etching power used. By choosing the proper parameters, an etch selectivity between the polymer and the emitter surface greater than 1000:1 is achieved.

More aspects of the invention will become apparent in the following description of preferred and alternative embodiments of the invention. The semiconductor devices of the present invention are applicable to a broad range of semiconductor device technologies and can be fabricated from a variety of semiconductor materials.

The following description discusses several presently preferred embodiments of the semiconductor devices of the present invention as preferably implemented in silicon substrates, since the majority of currently available semiconductor devices are fabricated in silicon substrates and the most commonly encountered applications of the present invention will involve silicon substrates. Nevertheless, the present invention may also advantageously be employed in gallium arsenide, germanium, and other semiconductor materials. Accordingly, the present invention is not intended to be limited to those devices fabricated in silicon semiconductor materials, but will include those devices fabricated in one or more of the available semiconductor materials and technologies available to those skilled in the art, for example, thin-film-transistor (TFT) technology using polysilicon on glass substrates.

It should be noted that the drawings are not true to scale. Further, various parts of the active elements have not been drawn to scale. Certain dimensions have been exaggerated in relation to other dimensions in order to provide a clearer illustration and understanding of the present invention.

In addition, although the embodiments illustrated herein are shown in two-dimensional views with various regions having depth and width, it should be clearly understood that these regions are illustrations of only a portion of a device that is actually a three-dimensional structure. Accordingly, these regions will have three dimensions, including length, width, and depth, when fabricated on an actual device. Moreover, while the present invention is illustrated by preferred and alternative embodiments directed to active and electronic devices, it is not intended that these illustration be a limitation on the scope or applicability of the present invention. It is not intended that the active and electronic devices of the present invention be limited to the physical structures illustrated. These structures are included to demonstrate the utility and application of the present invention to presently preferred and alternative embodiments.

FIG. 1A is a top view of an exemplary embodiment of the invention that integrates an electron lens and preferably, but optionally, an electrostatic shield, with an electron emitter. In FIG. 1A, the electron emitter 20 emits electrons that are focused using a co-planer electron lens 16 having a lens opening 18. The co-planer lens 16 is formed on a conductive layer and is held at a voltage potential relative to a cathode surface of the electron emitter 20. The amount of voltage chosen, lens geometry, and distance from the electron emitter 20 determines the amount of focus performed by the co-planer electron lens 16. Optionally, on the same conductive layer as the co-planer lens 16 is a co-planer shield 14 that is held at a different voltage than the co-planer lens 16. Preferably, the voltage of the co-planer shield 14 is held at about the same voltage as an anode target for the electron beam emitted by the electron emitter 20. The co-planer lens 16 is separated from the co-planer shield 14 by a gap 22 to provide electrical isolation.

FIG. 1B includes a cross-sectional view of the focused emitter of FIG. 1A along the I—I section. Also included is an anode 76 that is the target of the electron beam from electron emitter 20. The electron emitter 20 can be one of several types such as a direct tunneling emitter, a metal-insulator-metal emitter, a metal-insulator-semiconductor emitter, an array of spindt tip emitters, or a single spindt-tip emitter to name a few. The electron emitter 20 is formed within and/or disposed on a substrate 10, preferably a silicon substrate but other substrates such as glass, germanium, or gallium arsenide, for example can be used instead and still meet the spirit and scope of the invention. Disposed on the substrate 10 is a polymer layer 12 used as a spacer for the co-planer lens 16 and co-planer shield 14 formed in a conductive layer. The electrons emitted by the electron emitter 20 are focused by an electric field formed within the lens opening 18 and are attracted to the anode 76 that is preferably held at a high positive voltage relative to the electron emitter 20. The anode 76 is disposed an anode-lens distance 24 to achieve a focused spot on the anode. If the lens design chosen is such that the anode-lens distance 24 requires a small distance thereby creating a large electrostatic attractive force 26, then the co-planer shield layer 14 is optionally used and held at about the same potential as the anode 76 to reduce the electrostatic force 26. If the anode 76 is held at a anode-lens distance 24 such that the electrostatic force 26 is weak enough for a given application, then co-planer shield 14 is not necessary.

FIG. 2 is an illustration of an exemplary direct tunneling emitter that incorporates an integrated electron lens of the invention to create an integrated focusing emitter 60. In this embodiment, the substrate 10 is preferably a silicon substrate preferably heavily doped. Substrate 10 is alternatively any other conductive material or substrate that provides a supply of electrons. On substrate 10 a stack of thin-film layers 38 is applied or processed to create the direct tunneling emitter. A tunneling layer 30 is disposed on the substrate 10 and is preferably less than 500 Angstroms, more preferably about 100 Angstroms. On the tunneling layer is disposed a cathode layer 36 of preferably a thin film of metal such as about 50 to about 100 Angstroms of platinum, although other metals can be used. For example, other metals include but are not limited to gold, iridium, molybdenum, chromium, and tungsten. On the stack of thin-film layers 38 is disposed a polymer layer 12 used to space the electron lens 28 from the electron emitter. Preferably, the polymer layer is between about 2 to about 12 micrometers thick or greater. An anode 76 is disposed at a anode-lens spacing 24. The electron lens 28 is held at a voltage potential relative to the cathode layer 36 and creates an electric field 34, which focuses the electrons emitted from the electron emitter to create a focused beam 32. The electric field 34, the lens opening, and the anode-lens spacing 24 are chosen to provide a desired spot size on the anode 76.

Figure 3:
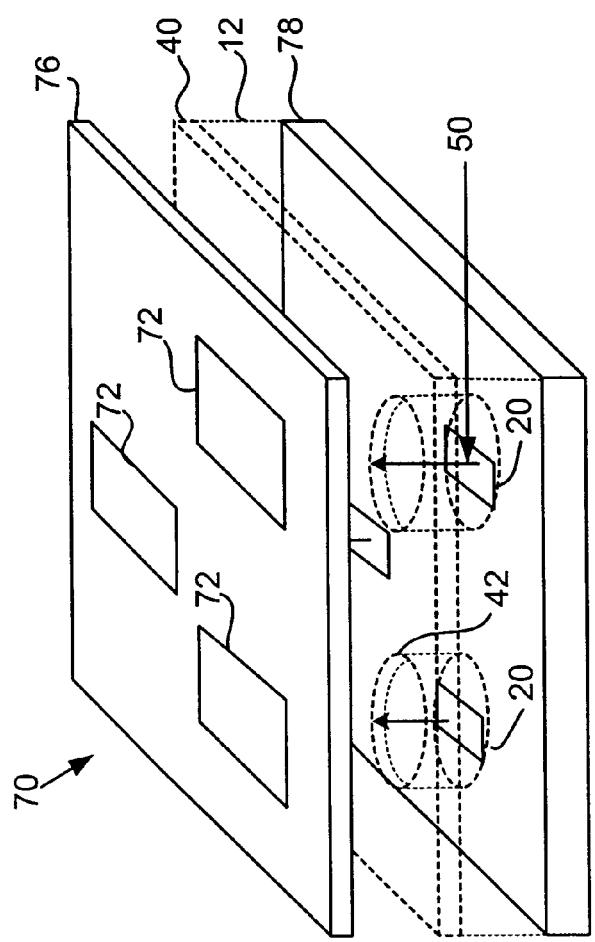
FIG. 3 is a perspective view of an exemplary embodiment of a display device that incorporates the invention.

FIG. 3 is a partial view of an embodiment of an exemplary display device 70 that incorporates the invention. A cathode layer 78 has electron emitters 20 disposed or formed within that create an electron beam 50. Disposed on the cathode layer is a polymer layer 12 that further has a lens layer 40 disposed on it. Formed within the lens layer 40 and the polymer layer 12 are opening 42 that allow the electron beams 50 to exit and reach pixels 72 on the anode 76, preferably the display screen. The pixels are preferably made up with phosphor material, either in a monochromatic or multiple color order, such as red, green, blue. When the electron beam 50 reaches the pixels 72, the phosphor material is excited by the electrons and emits photons that create visible light.

Figure 4:
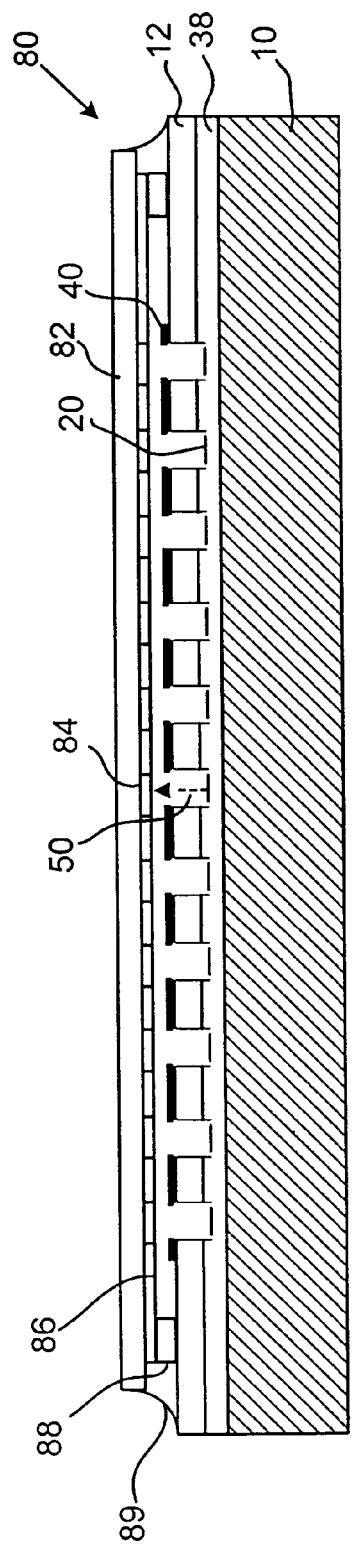
FIG. 4 is a cross-sectional view of an alternative exemplary embodiment of a display device that incorporates the invention.

FIG. 4 is an alternative embodiment of an integrated display device 80 that is illustrated in cross-section form. The integrated display device 80 has a substrate 10, preferably a silicon substrate that is processed with semiconductor processing to include a stack of thin-film layers 38 that incorporate electron emitters 20. The electron emitters 20 create electron beams 50 which are used to excite display pixel 84 made of phosphorous material. Disposed on the stack of thin-film layers 38 is a polymer layer 12 that has openings to allow electron beams 50 to pass through to lens layer 40 disposed on the polymer layer 12. The lens layer 40 has openings for focusing the electron beam 50 onto the display pixel 84. The display pixel 84 is formed within anode 86 that captures any stray electrons. The display pixels 84 and anode 86 are disposed on the display screen 82, preferably a glass or other transparent substrate. The anode 86 is spaced from the lens layer 40 by a spacer 88 that is also preferably a hermetic seal. Optionally, an alternative seal 86 is placed around the display to further provide a hermetic seal or adhesive joint between the display screen 82 and the substrate 10 with its stack of thin-film layers 38 and polymer layer 12.

FIG. 5 is a partial view of an exemplary embodiment of a mass storage device 90 that incorporates the invention. In this embodiment, the mass storage device 90 has at least three substrates, a substrate 10, a rotor substrate 92, and a stator substrate 94. The substrate 10 has a stack of thin-film layers processed on it that contains active devices such as electron emitters 20. Disposed on the stack of thin-film layers 38 is a polymer layer 12 that provides spacing for electron lens 28. The electron lens 28 creates a focused beam 32 that is used to read/write information on the surface of media 96 on the rotor substrate 92. The media surface is preferably made up of a phase change material that can exist in either a crystalline or amorphous state depending on the time and amount of energy expended on it by the focused electron beam. When a low power electron beam is used to read the crystalline or amorphous state, electrons are detected in the rotor substrate 92 by a reader circuit 98. The reader circuit 98 includes an amplifier 95 that detects the current in the rotor substrate 92 between media contact 91 and substrate contact 97. When the focused beam 32 strikes an amorphous spot 93 the amount of current which flows to the amplifier circuit is different than when the focused beam 32 strikes a crystalline area. Preferably, a conventional digital media recording format is used to record information in the media 96. To make an amorphous spot, a high-energy focused beam is presented to the surface of the media 96 for a short time and allowed to cool rapidly. To remove the amorphous spot and return the media 96 to a crystalline state, the amorphous spot 93 is heated with a high-energy focused beam 32 and allowed to cool slowly by slowly changing the energy of the focused beam 32.

FIG. 6 is an exemplary integrated mass storage device 100 that incorporates the invention illustrated in cross-sectional form. A substrate 10 has a stack of thin-film layers 38 that incorporates the electron emitters 20. Disposed on the stack of thin-film layers 38 is a polymer layer 12. Disposed on the polymer layer 12 is an electron lens layer 28 used to focus electrons from electron emitters 20 into a focused beam 32. The substrate 10 and its stack of thin-film layers 32 and polymer layer 12 are attached to a rotor substrate 92 using a spacer 88 and seal 89 to provide an evacuated environment, preferably less than $10^{-5}$ Torr. The rotor substrate 92 has a movable portion containing media 96. The movable portion is attached to the rotor substrate 92 using springs 152, preferable formed and etched from rotor substrate 92 using micro-mechanical machining techniques. The rotor substrate 92 is attached to a stator substrate 94 by seal/adhesive 158. Electrical contact is made by inter-substrate contacts 156. The stator substrate 94 and the rotor substrate 92 control the movement of the movable portion of the rotor substrate 92 by the use of an electrostatic stepper motor 154. The electrostatic stepper motor 154 is preferably movable in a first and second direction but some embodiments may limit the movement to a single direction. By providing for movement of the media 96, each electron emitter 20 can read/write several locations on media 96, thus providing for increased density of information storage. The polymer layer 12 provides for separation of the electron lens layer 28 from the electron emitter 20.

Figure 7:
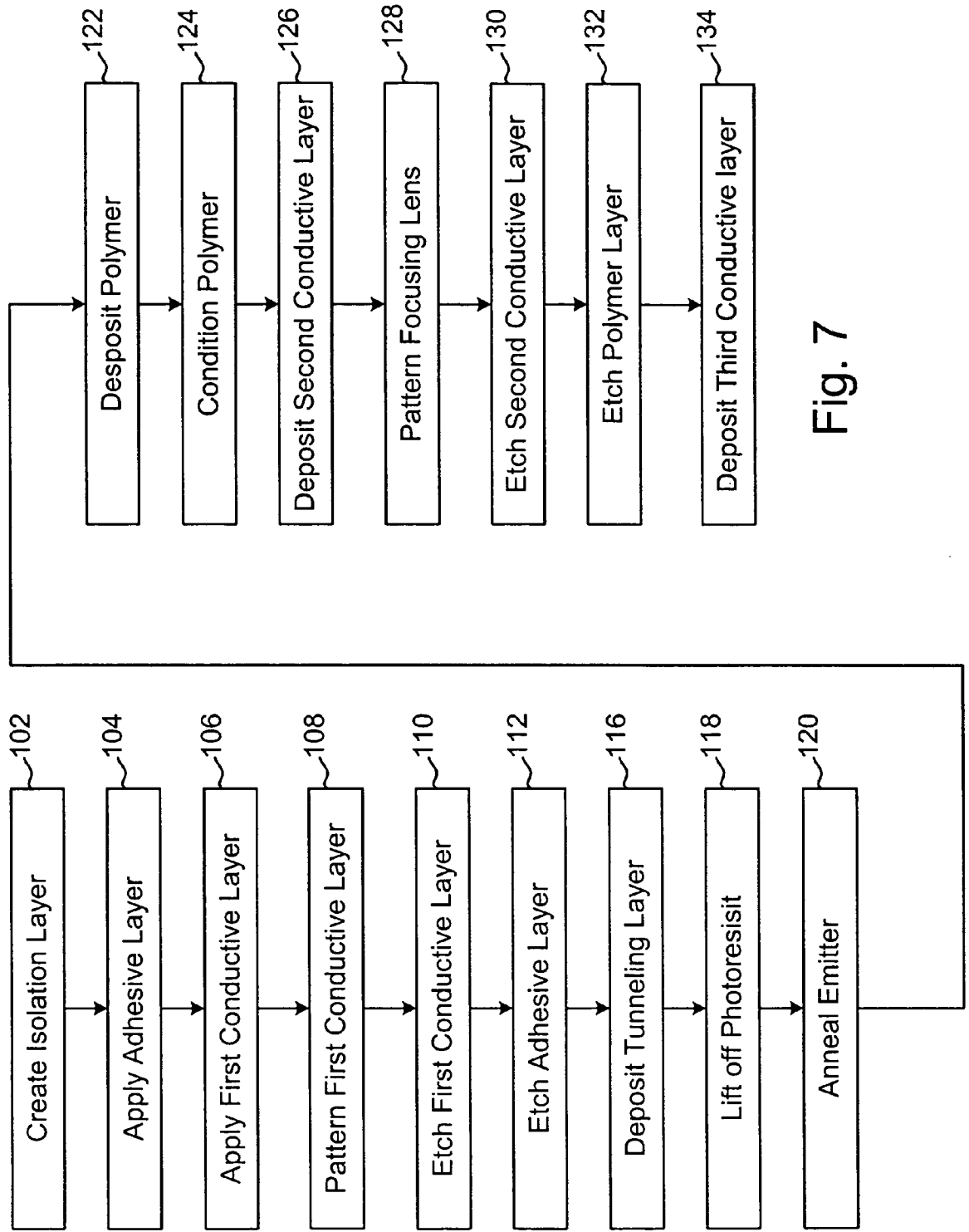
FIG. 7 is a block diagram of an exemplary process used to create an integrated focusing emitter including the steps to create an electron lens that incorporates a polymer spacer layer.

FIG. 7 is a flowchart of an exemplary general process used to create an integrated focusing emitter including the steps to create an electron lens using a polymer spacer layer. These process steps can be implemented with several different technologies for creating an integrated focusing emitter using conventional semiconductor processing techniques known to those skilled in the art. The integrated focusing emitter begins with the selection of a substrate, preferably silicon but other substrates are known to those skilled in the art and can be substituted and still meet the spirit and scope of the invention. The purpose of the substrate is to provide a source of electrons and also to provide a stable platform for further processing of a stack of thin-film layers that contain the electron emitter and also the processing of the integrated electron lens.

In step 102, an isolation layer is created on the substrate with at least one opening to define the location of the electron emitter such as by masking and growing or depositing dielectric materials. For a silicon substrate, the isolation layer is preferably field oxide growth (FOX) or other dielectrics such as thermal oxide, silicon nitride, silicon dioxide, or silicon carbide to name a few. In optional step 104, depending on the isolation layer used, an adhesive layer such as tantalum can be placed (disposed) on the isolation layer to allow for better adhesion of a first conductive layer that is applied in step 106. In step 108, the first conductive layer is patterned, preferably with photoresist, to create an opening for the well of the electron emitter. In step 110, the first conductive layer is etched in the opening, preferably a wet etch to create an anisotropic profile although other etch techniques can be substituted such as a dry etch. In step 112, the adhesive layer is preferably dry etched to create an isotropic profile. The etching of the adhesive layer is not performed of course if the optional adhesive layer is not used or applied in step 104. In step 116, a tunneling layer is preferably deposited on the exposed substrate surface and on top of the pattern material used to create the opening in the first conductive and adhesive layers. In step 118, preferably a lift off process is used to remove the pattern material and to lift off the tunneling material that was disposed on the patterning material without removing the tunneling material that is disposed on the substrate. For positive photoresist, the preferable lift off process uses an oxygen ash etch process.

In step 120 the processed substrate is subjected to an annealing process that increases the emission current density of the electron emitter.

In step 122, the polymer layer is deposited on the processed substrate. Then is step 124, the process substrate with the polymer layer is conditioned by curing the polymer layer to remove volatile components and compounds from the polymer material. The actual curing process used will depend on the type of polymer material chosen. In step 126, a second conductive layer is deposited on the polymer layer for use in creating the electron lens and optional shield.

In step 128 the second conductive layer is masked and patterned to create the focusing lens. In step 130, the second conductive layer is etched within the pattern openings to create the lens opening. Then in step 132, a selective etch is performed on the polymer layer to the surface of the electron emitter with preferably little undercut under the electron lens. In step 134, a third conductive layer is deposited over the second conductive layer and within the lens opening on the surface of the electron emitter to create a cathode layer on the tunneling layer of the electron emitter.

FIGS. 8–22 are exemplary illustrations of the processing of a substrate 10, preferably a silicon substrate, to create an integrated electron emitter using specific embodiments of semiconductor processing steps. The process steps shown are by way of example to make clearer an understanding of the invention in a specific embodiment and are not meant to limit the methods of making the invention.

Figure 8:
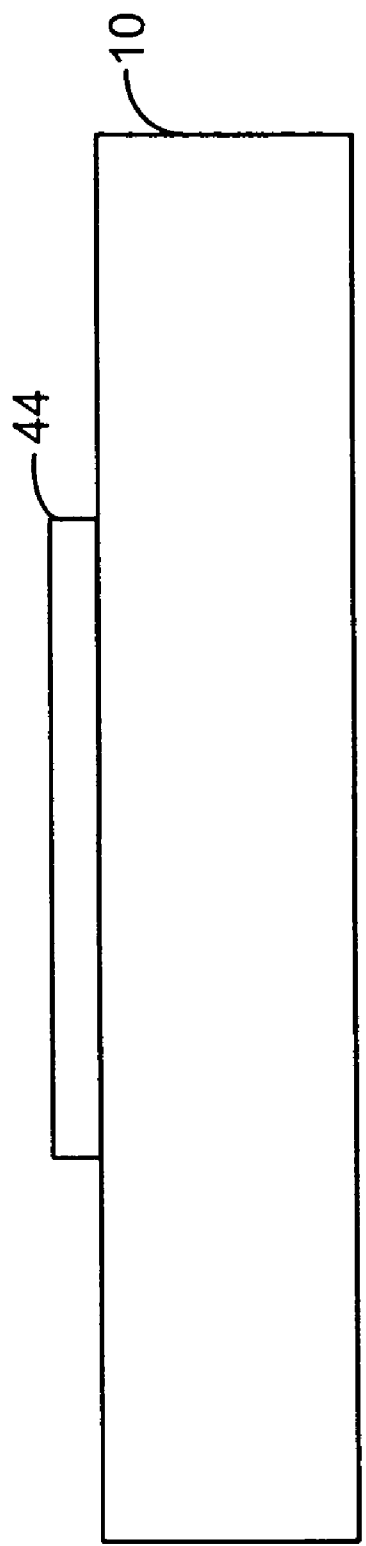
FIGS. 8–14 are illustrations of exemplary process steps to create an electron emitter that provides a base for the electron lens of the invention.

FIG. 8 shows substrate 10 having a FOX-mask 44 patterned thereon to define a location for the electron emitter surface. Preferably the Fox-mask 44 is a hard mask such as a dielectric but also could be a photoresist.

Figure 9:
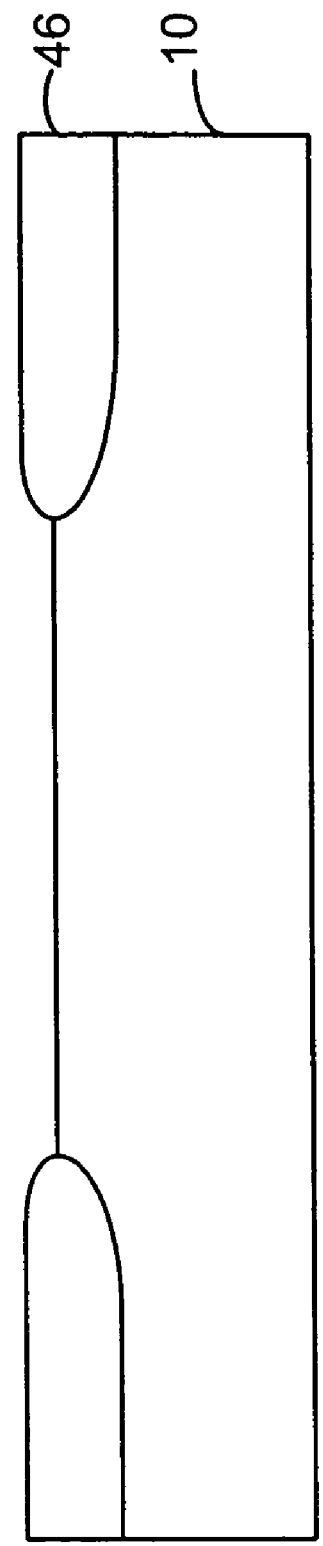

FIG. 9 shows the growth of the field oxide and the removal of the FOX-mask 44 from FIG. 8. The field oxide thickness is typically within the range of 3000–10,000 Angstroms.

Figure 10:
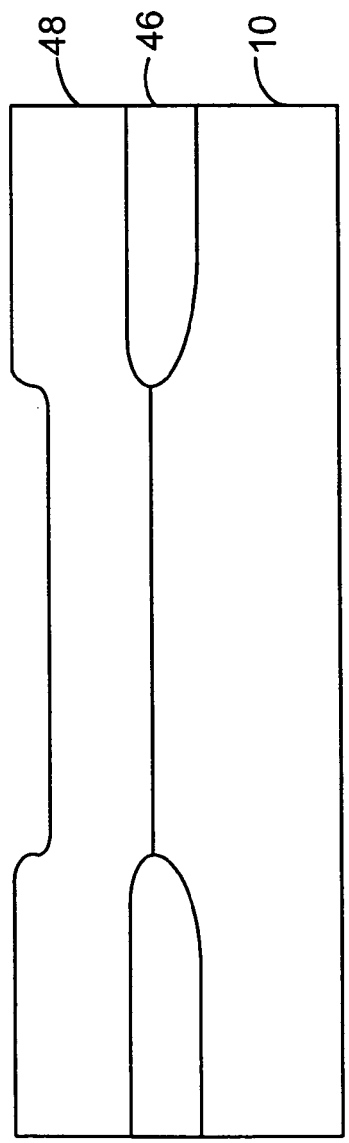

FIG. 10 shows the application of an optional adhesive layer 48, preferably tantalum, on the FOX and emitter surface areas over the surface of the substrate 10. Preferably the adhesive layer 48 is applied using a deposition process to a thickness of about 500 Angstroms.

Figure 11:
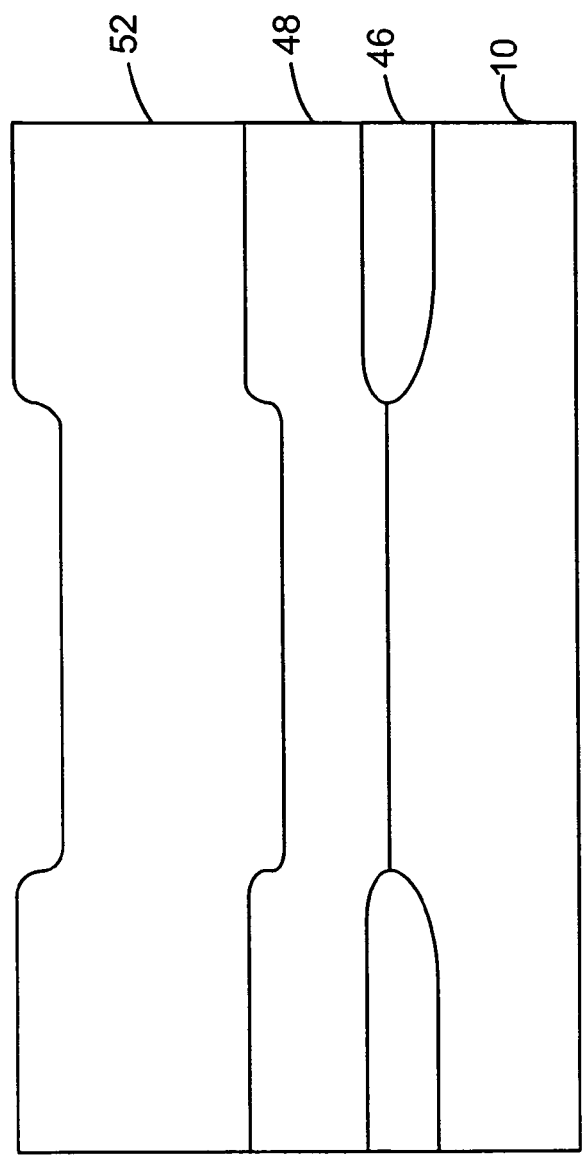

FIG. 11 shows the application of a first metal layer 52, preferably gold on top of the adhesive layer 48. The preferred thickness of the first metal layer 52 is about 2000 Angstroms. If a first metal layer 52 is chosen that has good adhesion properties to the insulating layer chosen then the adhesive layer 48 is not required.

Figure 12:
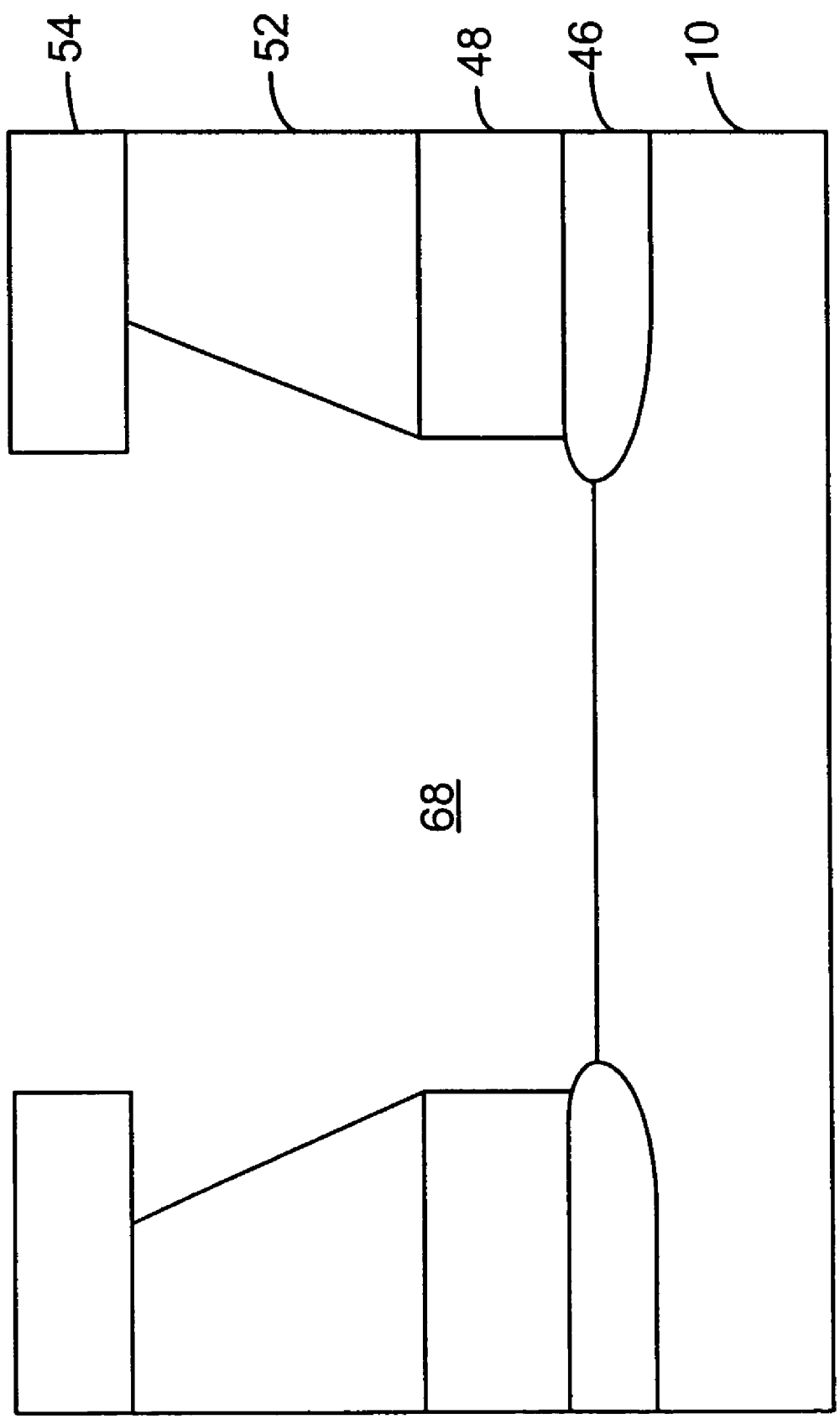

FIG. 12 illustrates the results of etching of the first metal layer 52 and the adhesive layer 48. To perform the etching, first a first metal photoresist is applied on the first metal layer 52 and patterned to define an opening where etching is to occur. The opening in the first metal photomask is preferably aligned over the emitter surface defined in the FOX material. The first conductive layer is preferably wet etched to form an anisotropic profile in which the portion of the first metal layer 52 next to the first metal photoresist 54 is undercut from the opening. Optionally, a dry etch process can be used. If an adhesive layer 48 is used, then the adhesive layer 48 is preferably dry etched to form an isotropic profile having substantially parallel side walls from the first metal layer 52 to the substrate 10 surface. The etching of the first metal layer 52 and the adhesive layer 48 creates the emitter well 68.

Figure 13:
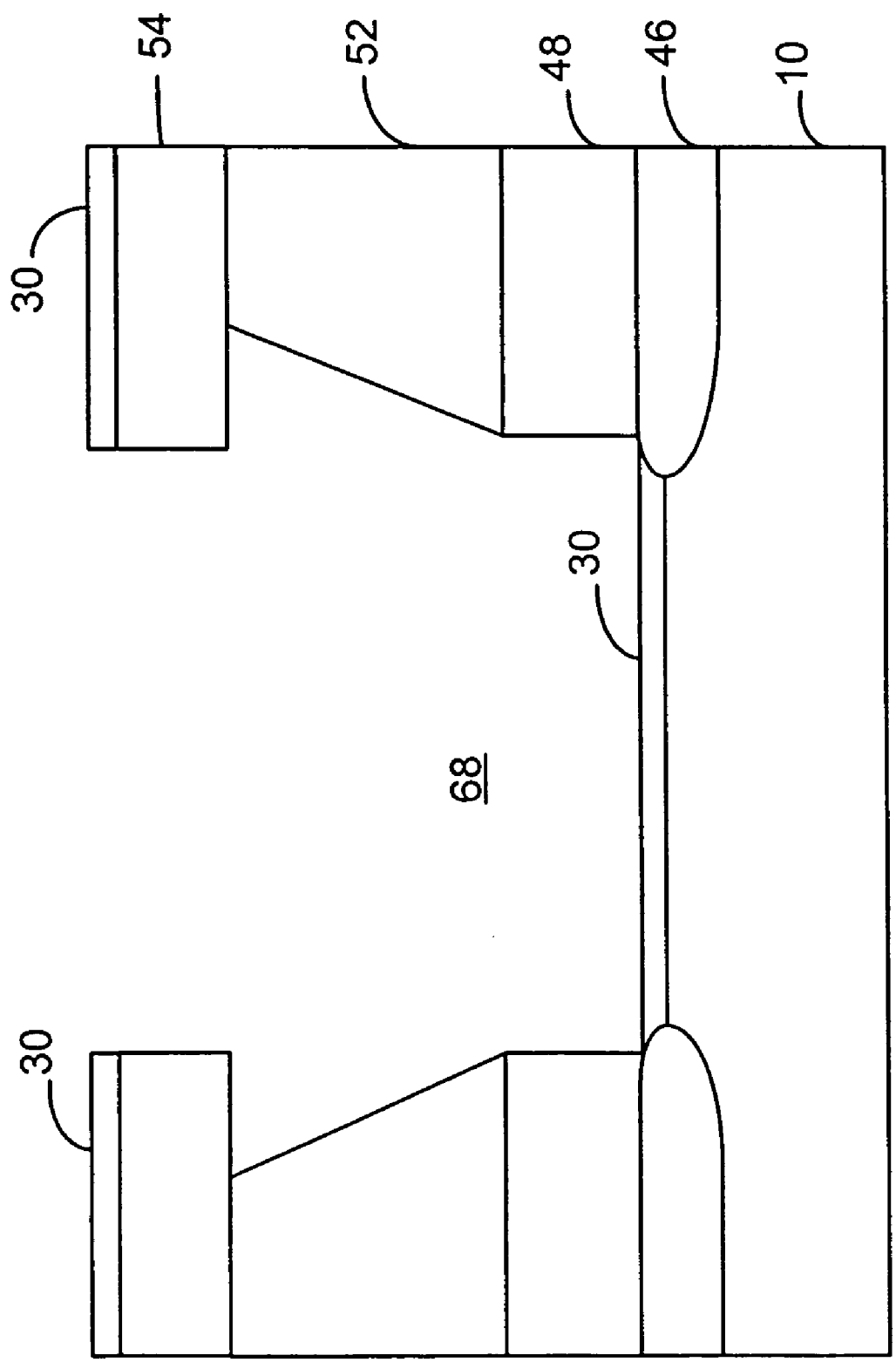

FIG. 13 illustrates the result of a deposition of the tunneling layer 30 on the processed substrate 10. The tunneling layer 30 is applied to and disposed on the surface of the first metal photomask 54 and the exposed surface of substrate 10 within the emitter well 68. Preferably the tunneling layer 30 is applied to a thickness of about 50 to about 100 Angstroms using a high dielectric film such as $TiO_x$, WSiN, $TaAlO_x$, $AlO_x$, $AlO_xN_y$, and $TaAlO_xN_y$, but preferably $TiO_x$ to about 100 Angstroms. Other possible dielectric films include silicon-based dielectrics such as about 200 to about 500 Angstroms of SiN and SiC. Other dielectrics that can be used to create a metal insulator semiconductor emitter are known to those skilled in the art.

Figure 14:
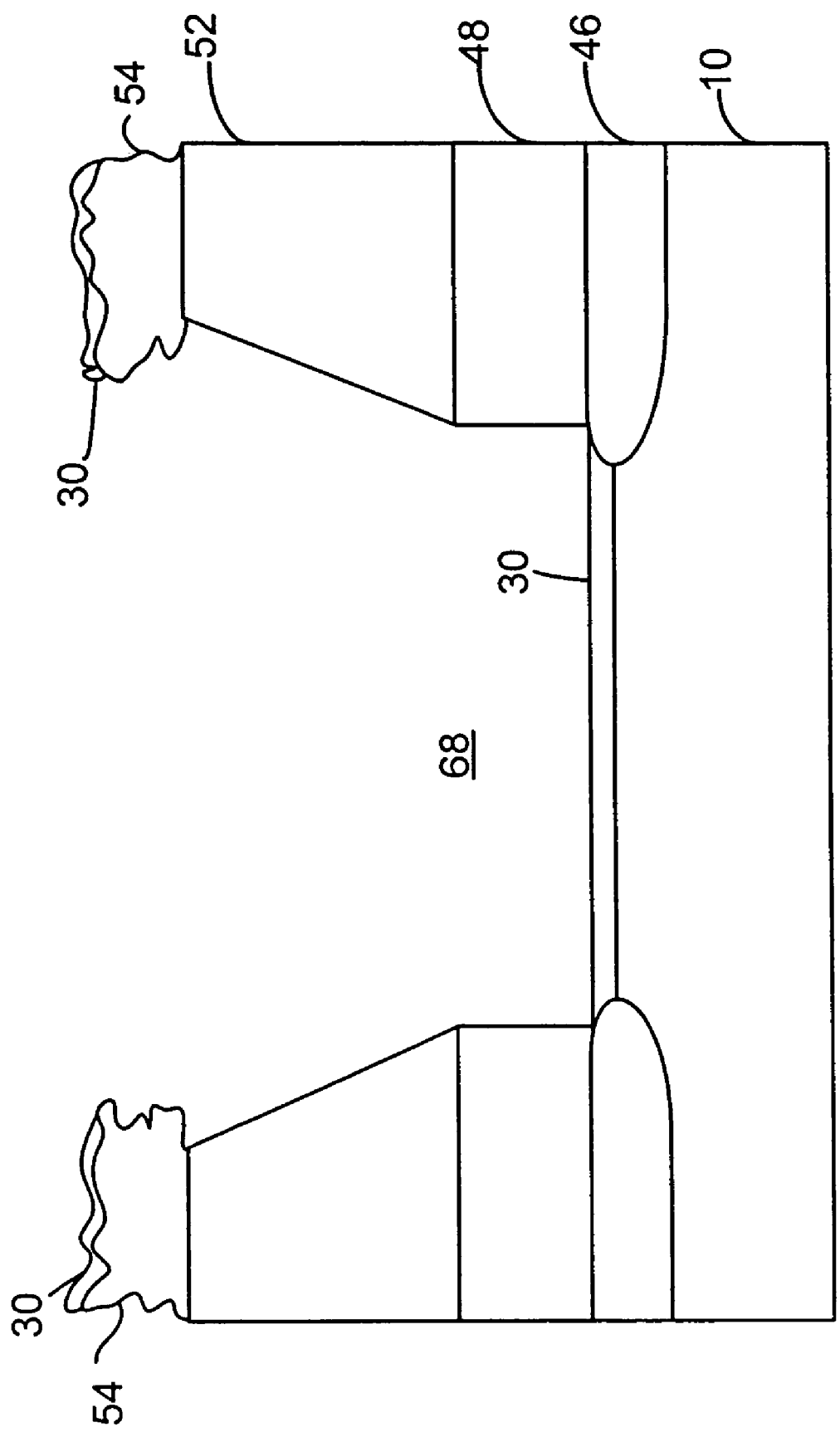

FIG. 14 is an illustration of a lift off process used to remove the first metal photoresist 54 and the tunneling layer 30 that is deposited on it. An oxygen rich ash etch is used to remove the first metal photoresist 54 and the portion of the tunneling layer 30 on the first metal photoresist 54. Preferably the process used is directional enough to not affect the portion of tunneling layer 30 disposed in the emitter well 68.

FIGS. 15 and 16 are charts of temperature over time for alternative annealing processes 140 and 142, respectively, used to increase the emitter current from the emitter. In FIG. 15 the processed substrate 10 after the ash etch in FIG. 14 is raised to a temperature of 400 C within about 10 minutes and held there for about 30 minutes. Then, the process substrate 10 is slowly brought back to room temperature (about 25 C) over about 55 minutes. In FIG. 16, the processed substrate 10 is raised from room temperature to about 600 C in about 10 minutes and held there for about 30 minutes. Then the processed substrate 10 is slowly brought back to room temperature over the course of about 100 minutes.

FIG. 17 illustrates the application of polymer layer 56 onto the stack of thin-film layer 38 on the processed substrate 10. The polymer layer 56 is preferably applied using a positive photoresist such as novolac based resist although it is anticipated that SU8 material would work. Preferably the resist is spin-coated to about 5.5 to about 6.5 microns thick and baked on a contact hot plate at about 125 C for 2 min. The thickness of the polymer material is determined by the lens design and can range usually between about 2 microns and about 12 microns. Because polymer material may have volatile components, the preferred process is to perform a curing of the polymer material to remove most of the volatile content.

FIG. 18 is a chart of an exemplary curing process to remove the volatile content from the polymer layer 56 material. The processed substrate 10 with the applied polymer layer 56 is placed in an over and the temperature is ramped up from room temperature (about 25 C) to 180 C in about 1 hour. Then the polymer is cured at 180 C for about 4 hours before the substrate is ramped down back to room temperature in about 1 hour. The curing process is easily adjusted to account to optimize for different polymer materials. Using this process with the novolac based resist, empirical results show that a vacuum of $5 \times 10^{-8}$ Torr can be maintained using the polymer layer 56.

FIG. 19 illustrates the results of an application of a second conductive layer 58 on the polymer layer 56 used as a lens layer. The interface between the second conductive layer 58 and polymer should have a low stress to provide a smooth surface and to prevent cracks and voids. Empirical testing indicates that using gold, which is malleable, for the second conductive layer 58 provides such a low-stress interface. Other malleable conductive layers or metals and semiconductors that have a temperature expansion coefficient substantially similar to the polymer material chosen can be used as the second conductive layer 58. Thus, the actual selection of material for the second conductive layer is dependent on the choice of polymer material used to create the spacer between the emitter and the lens layer.

FIG. 20 illustrates the result of an etch of the second conductive layer 58 to create a lens opening having a lens diameter 64. To perform the etch, a second conductive mask 62, preferably photoresist, is applied to the surface of second conductive layer 58 and patterned to provide an opening where the second conductive layer 58 is etched. The opening is determined by the desired lens geometry but is preferably centered over the emitter surface in the emitter well 68. The lens opening is also used to perform an etch of the polymer layer 56 thereby exposing the tunneling layer 30 on the substrate 10 surface.

Figure 21:
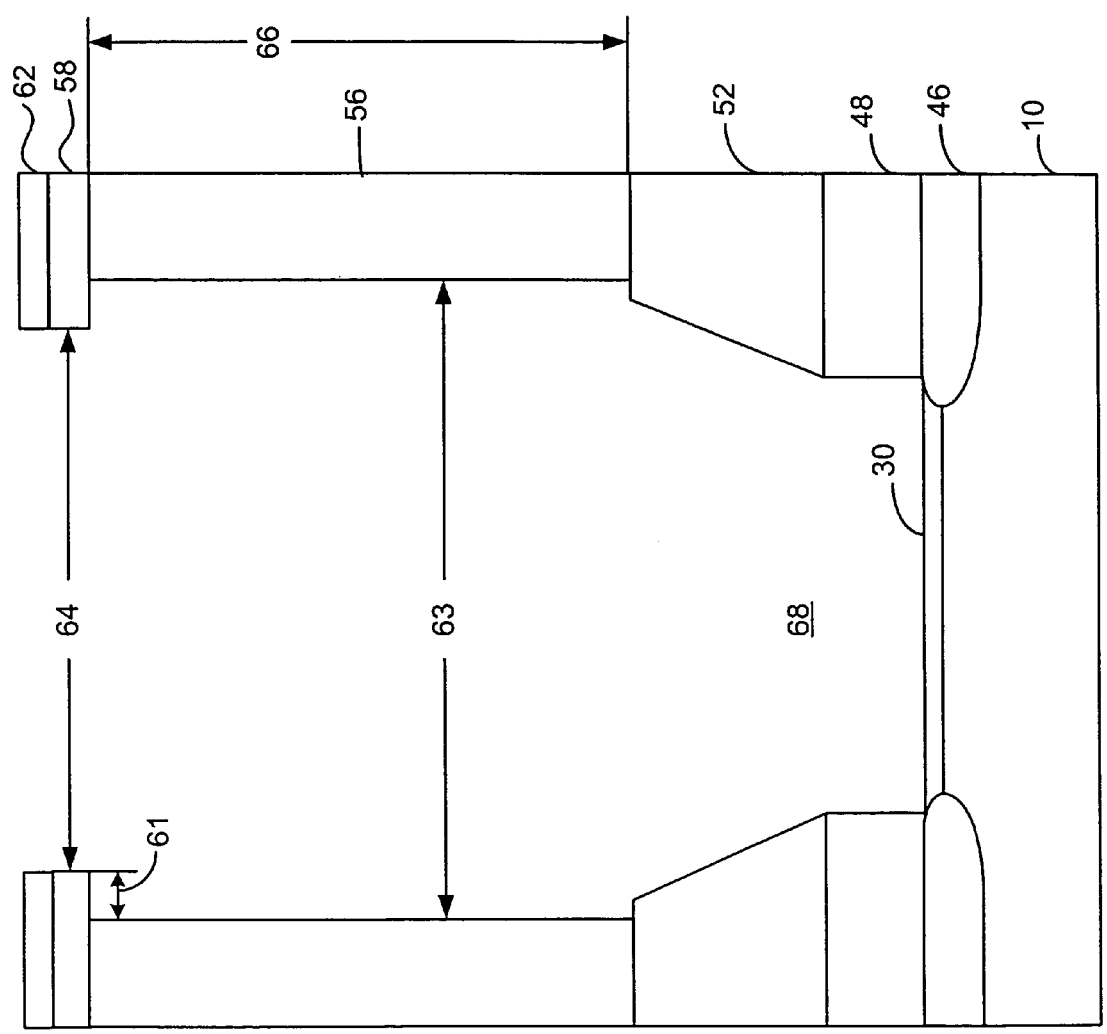
FIG. 21 is an illustration of the result of a selective etching process that etches the polymer layer to expose the electron emitter surface.

FIG. 21 illustrates the result of the polymer layer 56 etch. The etch is preferably done in DryTek 384T. Preferably the second conductive mask 62 is left on the second conductive layer 58 to prevent the second conductive layer becoming partially etched during the polymer etch process. During the polymer etch, the $O_2$ level is about 200 sccms, the pressure about 2500 mT, the power set to about 85 Watts, the He pressure set to about 10 Torr and the top temperature to about 20 C and the bottom temperature to about 12 C. The etch process takes about 135 minutes to clear about 6.5 microns of resist. The etch recipe generates about 95 V of DC bias. The etch process balances the etch rate, etch residue, and power to maintain as small a DC bias as possible. The higher the power, the faster the etch rate but more residue created. The power should be chosen to prevent the second conductive layer 58 from sputtering, thus causing residue that is difficult to remove. Preferably the resulting etch profile creates an undercut 61 that is about 1 to about 2 microns for about each 6.5 microns of thickness of the polymer layer 56 etched. By using a polymer etch process the etch selectivity between the polymer and the tunneling layer material, such as $TiO_x$ is highly selective, preferably greater than 1000:1. Empirical test results show that the etch selectivity for the preferred process is about 6000:1, meaning that the etch rate for polymer is about 6000 Angstroms/min and the $TiO_x$ is less than about 1 Angstrom/min.

Figure 22:
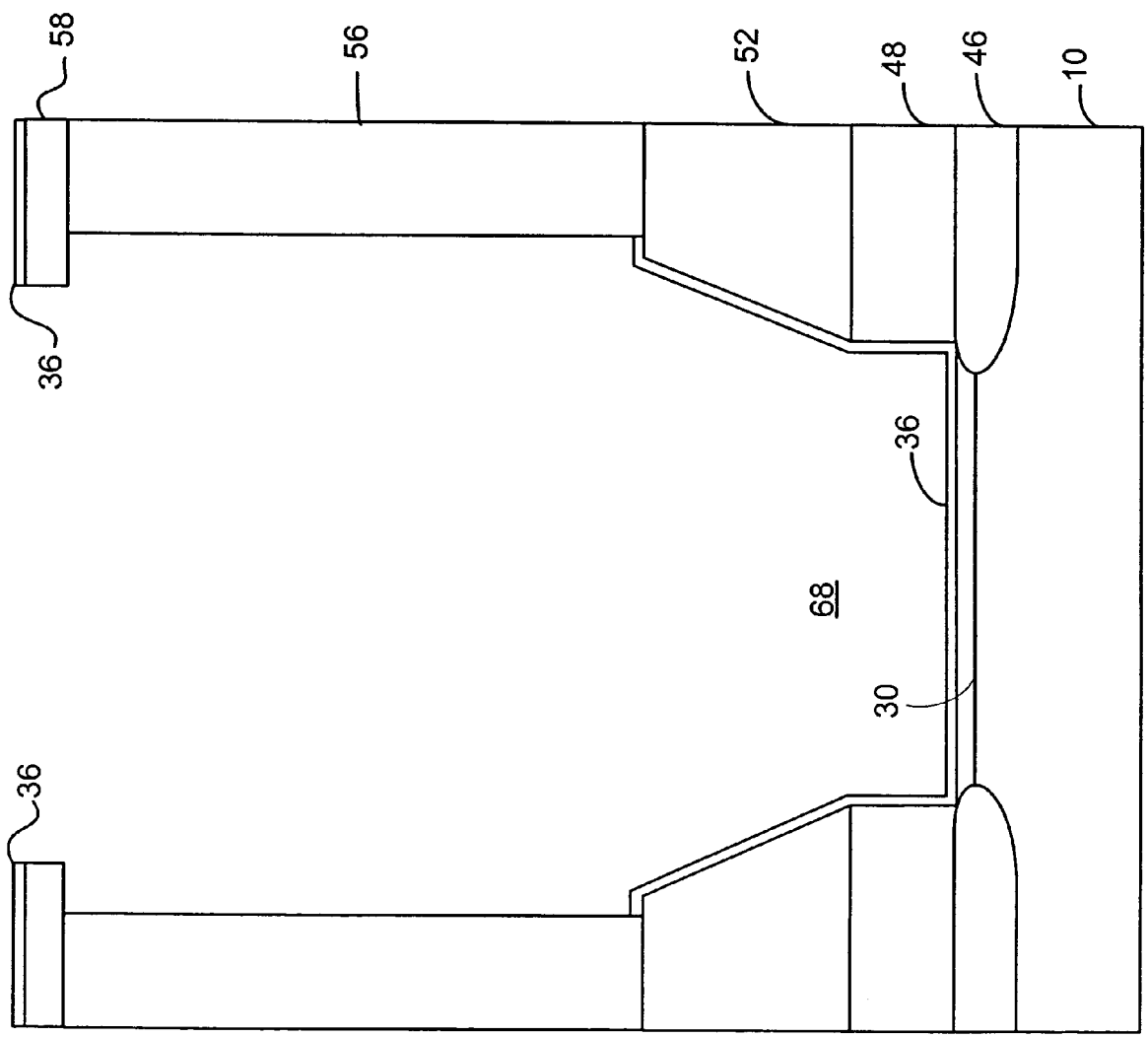
FIG. 22 is an illustration of the result of a deposition of a emitter cathode layer to finish creating the integrated focusing emitter.

FIG. 22 illustrates the application of a cathode layer 36 to the surface of the tunneling layer 36, sidewalls of the emitter well 68, and the surface of the second conductive layer 58 after the second conductive mask 62 is removed. Preferably, the cathode layer 36 is deposited to a thickness of about 50 to about 150 Angstroms of platinum, more preferably about 100 Angstroms. Other materials for the cathode layer 36 include iridium, gold, and tungsten just to name a few, but preferably platinum.

It should be noted that it would be obvious to those skilled in the art that many variations and modifications may be made to the disclosed embodiments without substantially departing from the invention. All such variations and modifications are intended to be included herein within the scope of the present invention, as set forth in the following claims.

What is claimed is:

1. An electron lens for an electron emitter, comprising:
   a focusing lens layer; and
   a polymer spacer layer between the focusing lens layer and the electron emitter wherein the polymer spacer layer defining at least one opening having an undercut of about 1 micron to about 2 microns per about 6.5 microns of depth.

2. The electron lens of claim 1 wherein the polymer spacer material is between about 2 microns and about 12 microns thick.

3. The electron lens of claim 1 wherein the polymer spacer layer has been cured to remove volatile content.

4. A focused electron emitter comprising the electron lens of claim 1.

5. An electronic device comprising at least one electron lens of claim 1.

6. A focused emitter, comprising:
   a tunneling layer less than about 500 angstroms in thickness disposed on a semiconductor substrate;
   a polymer spacer layer disposed on the semiconductor substrate and defining a first opening, havinq an undercut of about 1 micron to about 2 microns per about 6.5 microns of depth, disposed over the tunneling layer;
   a focusing lens layer disposed on the polymer spacer layer and defining a second opening disposed over the tunneling layer; and
   a cathode layer disposed on the tunneling layer.

7. The focused emitter of claim 6 wherein the polymer spacer layer is between about 2 microns and about 12 microns thick.

8. The focused emitter of claim 6 wherein the polymer spacer layer has been cured to remove volatile content.

9. An electronic device comprising at least one focused emitter of claim 6.

10. The electronic device of claim 9 wherein the electronic device is a display device.

11. The electronic device of claim 9 wherein the electronic device is a mass storage device.

12. A focused electron emitter, comprising:
    a tunneling layer less than about 500 angstroms in thickness;
    means for focusing electrons emitted from tunneling layer; and
    polymer means for spacing the means for focusing electrons from the tunneling layer wherein the polymer means has been cured to remove volatile components and defines an opening having an undercut of about 1 micron to about 2 microns per about 6.5 microns of depth.

13. The focused electron emitter of claim 12 wherein the tunneling layer is about 100 Angstroms.

14. The focused electron emitter of claim 12 wherein the means for focusing electrons and the polymer means for spacing have substantially the same temperature expansion coefficient.

* * * * *

UNITED STATES PATENT AND TRADEMARK OFFICE
CERTIFICATE OF CORRECTION

| | | |
|---|---|---|
| PATENT NO. | : 7,148,621 B2 | |
| APPLICATION NO. | : 10/825754 | |
| DATED | : December 12, 2006 | |
| INVENTOR(S) | : Zhizhang Chen et al. | |

It is certified that error appears in the above-identified patent and that said Letters Patent is hereby corrected as shown below:

On the Title page, in field (73), in "Assignee", in column 1, line 2, delete "LP.," and insert -- L.P., --, therefor.

In column 10, line 31, in Claim 6, delete "havinq" and insert -- having --, therefor.

Signed and Sealed this

Twenty-seventh Day of October, 2009

David J. Kappos
*Director of the United States Patent and Trademark Office*